US009425949B2

(12) United States Patent
Fong et al.

(10) Patent No.: US 9,425,949 B2
(45) Date of Patent: Aug. 23, 2016

(54) COMMUNICATION UNIT AND SLICED RADIO FREQUENCY MODULE THEREFOR

(71) Applicant: MediaTek Singapore Pte. Ltd., Singapore (SG)

(72) Inventors: Neric Fong, Santa Clara, CA (US); Siu-Chuang Ivan Lu, San Jose, CA (US); Chunwei Chang, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/274,759

(22) Filed: May 11, 2014

(65) Prior Publication Data

US 2015/0063510 A1  Mar. 5, 2015

Related U.S. Application Data

(60) Provisional application No. 61/872,948, filed on Sep. 3, 2013.

(51) Int. Cl.
*H04B 1/16* (2006.01)
*H04L 7/00* (2006.01)

(52) U.S. Cl.
CPC .................................. *H04L 7/0079* (2013.01)

(58) Field of Classification Search
CPC ............ H04B 1/04; H04B 1/10; H04B 1/40; H04B 7/185; H04B 15/00; H04B 17/00; H04B 1/16; H04L 25/49; H04L 7/00; H04L 7/0079
USPC ........ 370/252, 316; 375/219, 239, 295, 316, 375/340, 350, 354; 455/67.11, 84, 129, 455/323, 349
See application file for complete search history.

(56) References Cited

U.S. PATENT DOCUMENTS

| 5,886,582 A | * | 3/1999 | Stansell ........................ 331/1 A |
| 6,265,948 B1 | * | 7/2001 | Stevenson ..................... 332/101 |
| 6,438,187 B1 | * | 8/2002 | Abbey .......................... 375/368 |
| 2009/0175300 A1 | * | 7/2009 | Matsuya et al. .............. 370/542 |
| 2010/0013530 A1 | * | 1/2010 | Kim et al. .................... 327/149 |
| 2010/0102888 A1 | * | 4/2010 | Edwards et al. ................ 331/16 |
| 2012/0320442 A1 | * | 12/2012 | Gabory ......................... 359/238 |
| 2013/0147529 A1 | * | 6/2013 | Ganesan et al. .............. 327/156 |
| 2013/0336647 A1 | * | 12/2013 | Le Taillandier De Gabory ............. H04B 10/0775 398/25 |
| 2014/0192935 A1 | * | 7/2014 | Palusa et al. ................. 375/340 |

* cited by examiner

*Primary Examiner* — Sam K Ahn
*Assistant Examiner* — Shawkat M Ali
(74) *Attorney, Agent, or Firm* — Winston Hsu; Scott Margo

(57) ABSTRACT

A communication unit includes at least one divider module arranged to receive a radio frequency (RF) signal and output a divided representation of the RF signal, and a plurality of sliced RF modules. Each of the plurality of sliced RF modules includes: an input for receiving a clock signal; a timing synchronization module arranged to receive the divided representation of the RF signal and synchronize the divided representation of the RF signal to the clock signal, across the plurality of sliced RF modules; and at least one logic module operably coupled to the timing synchronization module and arranged to receive the clock signal and a synchronized output from the timing synchronization module. A combiner port is arranged to couple a number of synchronized outputs from the plurality of sliced RF modules.

18 Claims, 7 Drawing Sheets

COMMUNICATION UNIT AND SLICED RADIO FREQUENCY MODULE THEREFOR

CROSS REFERENCE TO RELATED APPLICATIONS

This application claims the benefit of U.S. provisional application No. 61/872,948, filed on Sep. 3, 2013 and incorporated herein by reference.

BACKGROUND

The field of this invention relates to an apparatus for reducing current usage in radio frequency (RF) communication units, and in particular for reducing current in sliced RF communication units.

In the field of radio frequency (RF) communication units, slicing of components and circuits across a number of parallel integrated circuits (ICs) is utilised in order to reduce the amount of current drawn by the RF communication units, thereby increasing their efficiency and, in the case of wireless devices, potentially enhancing battery life.

Referring to FIG. 1, a known slicing architecture 100 is illustrated. In this known architecture, a local oscillator input 102 provides an LO signal 120 to a first input 110 of AND logic gate 109. A divide-by-N module, for example a divide-by-2 module, 104 increases the duty cycle of LO signal 120 and outputs a DIV2 signal 122 to a second input 111 of the AND logic gate 109. In this case, the duty cycle of DIV2 122 is preconfigured so that the AND logic gate 109 outputs a 25% duty cycle square wave local oscillator buffered signal (LOBUF) 124.

The AND logic gate 109 that generates the LOBUF signal 124 is a noise sensitive module and requires a high current to maintain signal integrity in both signal strength and noise level of LOBUF 124. As a result, these circuits generally consume a large amount of current. In the known slicing architecture 100, the AND logic gate 109 is grouped on a single slice 128.

A disadvantage of the slicing architecture 100 is that the divide-by-N module 104 has to drive a plurality of slices 132 comprising noise sensitive circuits (AND logic gates 109) and, therefore, the divide-by-N module 104 consumes a large amount of current. This potentially reduces the overall efficiency of the slicing architecture 100. In effect, the divide-by-N module 104 is designed to meet a worst-case scenario and thereby has a significant current overhead.

It may be advantageous to further improve current saving of the slicing architecture 100.

U.S. Pat. No. 6,072,994 discloses a digitally programmable multifunctional radio having a common transmit module. This common transmit module is internally programmably reconfigurable and self-contained for channelized operation in each of a plurality of different radio modes, for digitally processing a bit stream into a digital signal, converting the digital signal into an analog signal and frequency translating the analog signal into an RF signal. An antenna interface module is coupled to the antenna and the common transmit module, for performing further processing of the RF signal and for providing the further processed RF signal to the antenna for transmission. The common transmit module and the antenna inter-face module are partitioned such that the common transmit module includes components that are programmably reconfigurable for operation in all of the plurality of different radio modes.

Thus, a need exists for an improved transmitter architecture, receiver, and/or transceiver that may be capable of further reducing current consumption when compared to the prior art.

SUMMARY

Accordingly, the invention seeks to mitigate, alleviate or eliminate one or more of the above mentioned disadvantages singly or in any combination. Aspects of the invention provide a communication unit and a sliced radio frequency module, as described in the appended claims.

According to a first aspect of the invention, there is provided a communication unit comprising at least one divider module arranged to receive a radio frequency (RF) signal and output a divided representation of the RF signal, and a plurality of sliced RF modules. Each of the plurality of sliced RF modules comprises: an input for receiving a clock signal; a timing synchronisation module arranged to receive the divided representation of the RF signal and synchronise the divided representation of the RF signal to the clock signal, across the plurality of sliced RF modules; and at least one logic module operably coupled to the timing synchronisation module and arranged to receive the clock signal and a synchronised output from the timing synchronisation module. A combiner port is arranged to couple a number of synchronised outputs from the plurality of sliced RF modules.

In this manner, a mechanism for current saving and increasing available output power is described.

According to an optional feature of the invention, a timing synchronisation module may be arranged to output a time adjusted divided representation of the RF signal.

According to an optional feature of the invention, the timing synchronisation module may be at least one flip-flop module. According to an optional feature of the invention, the at least one flip-flop module may be a D-type flip flop. According to an optional feature of the invention, the timing synchronisation module may be a driver module.

According to an optional feature of the invention, each sliced RF module may comprise the at least one divider module.

According to an optional feature of the invention, the at least one logic module may comprise a logic AND module.

According to an optional feature of the invention, the RF signal may be a local oscillator signal and the at least one divider module may comprise a divide-by-two module.

According to an optional feature of the invention, the communication unit may further comprise a controller arranged to selectively enable one or more of the plurality of sliced RF modules.

According to a second aspect of the invention, there is provided a sliced radio frequency (RF) module comprising an input for receiving from at least one divider module a divided representation of a RF signal, an input for receiving a clock signal, and a timing synchronisation module arranged to receive the divided representation of the RF signal and synchronise the divided representation of the RF signal to the clock signal, across the plurality of sliced RF modules. At least one logic module is operably coupled to the timing synchronisation module and is arranged to receive the clock signal and a synchronised output from the timing synchronisation module. An output port is provided for outputting a synchronised output to a combiner that is operably coupleable to at least one further sliced RF module.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Examples of the invention will be described in terms of a communication unit and sliced radio frequency module. However, it will be appreciated by a skilled artisan that the inventive concept herein described may be embodied in any type of communication unit or sliced radio frequency module. In a number of applications, the adaptation of the communication unit and sliced radio frequency module, in accordance with the examples of the invention, may allow for current saving. In particular, a potential random initial condition of timing modules within a transmitter, receiver, and/or transceiver architecture may be synchronised across a plurality of sliced radio frequency modules, thereby reducing current consumption and advantageously not influencing the potential RF output powers available.

In examples of the invention, the term 'baseband signal' encompasses any signal that contains data at a baseband frequency, for example quadrature baseband signals. In examples of the invention, the term 'clock signal' or 'local oscillator (LO) signal' encompasses any clock at a high (e.g.) radio frequency. In examples of the invention, the term radio frequency (RF) signal encompasses any signal that contains data in the radio frequency domain.

Examples of the invention will be described in terms of a divide-by-2 module; however it is envisaged that in other implementations, the divider module may encompass any divide-by-N arrangement.

Figure 2:
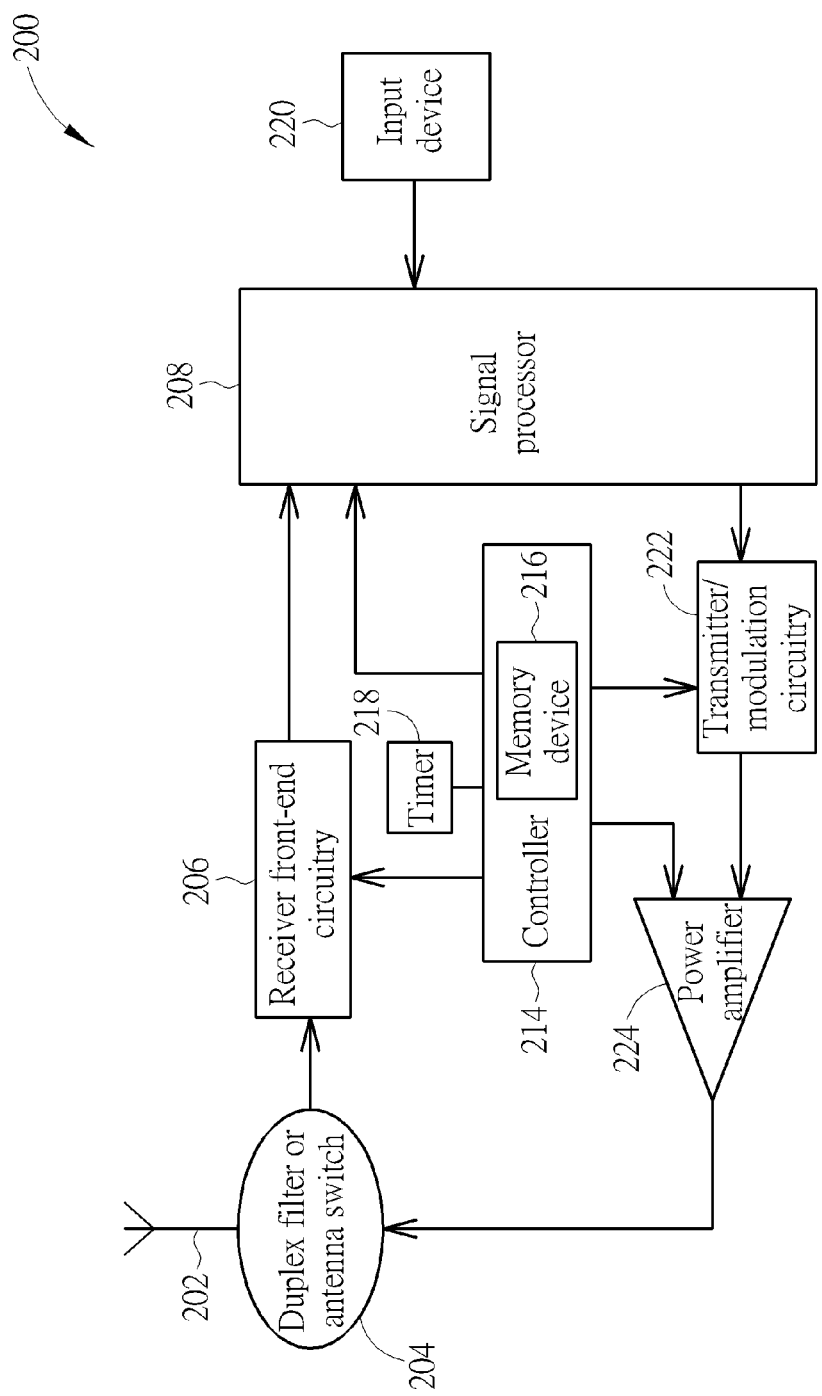
FIG. 2 illustrates a block diagram of a wireless communications unit adapted according to some aspects of the invention.

Referring first to FIG. 2, a block diagram of a wireless communication unit (sometimes referred to as a mobile subscriber unit (MS) in the context of cellular communications or a user equipment (UE) in terms of a $3^{rd}$ generation partnership project (3GPP™) communication system) is shown, in accordance with a preferred embodiment of the invention. The wireless communication unit 200 contains an antenna 202 preferably coupled to a duplex filter or antenna switch 204 that provides isolation between receive and transmit chains within the MS 200.

The receiver chain, as known in the art, includes receiver front-end circuitry 206 (effectively providing reception, filtering and intermediate or base-band frequency conversion). The front-end circuitry 206 is serially coupled to a signal processor 208. An output from the signal processor 208 is provided to a suitable user interface, such as a screen or flat panel display. The receiver chain also includes a controller 214 that maintains overall subscriber unit control. The controller 214 is also coupled to the receiver front-end circuitry 206 and the signal processor 208 (generally realised by a digital signal processor (DSP)). The controller is also coupled to a memory device 216 that selectively stores operating regimes, such as decoding/encoding functions, synchronisation patterns, code sequences, and the like.

Furthermore, a timer 218 is operably coupled to the controller 214 to control the timing of operations (transmission or reception of time-dependent signals) within the MS 200.

As regards the transmit chain, this essentially includes an input device 220, such as a keypad, coupled in series through transmitter/modulation circuitry 222 and a power amplifier 224 to the antenna 202. The transmitter/modulation circuitry 222 and the power amplifier 224 are operationally responsive to the controller 214.

The signal processor function 208 in the transmit chain may be implemented as distinct from the processor in the receive chain. Alternatively, a single processor 208 may be used to implement processing of both transmit and receive signals, as shown in FIG. 2. Clearly, the various components within the MS 200 can be realised indiscrete or integrated component form, with an ultimate structure therefore being merely an application-specific or design selection.

Figure 3:
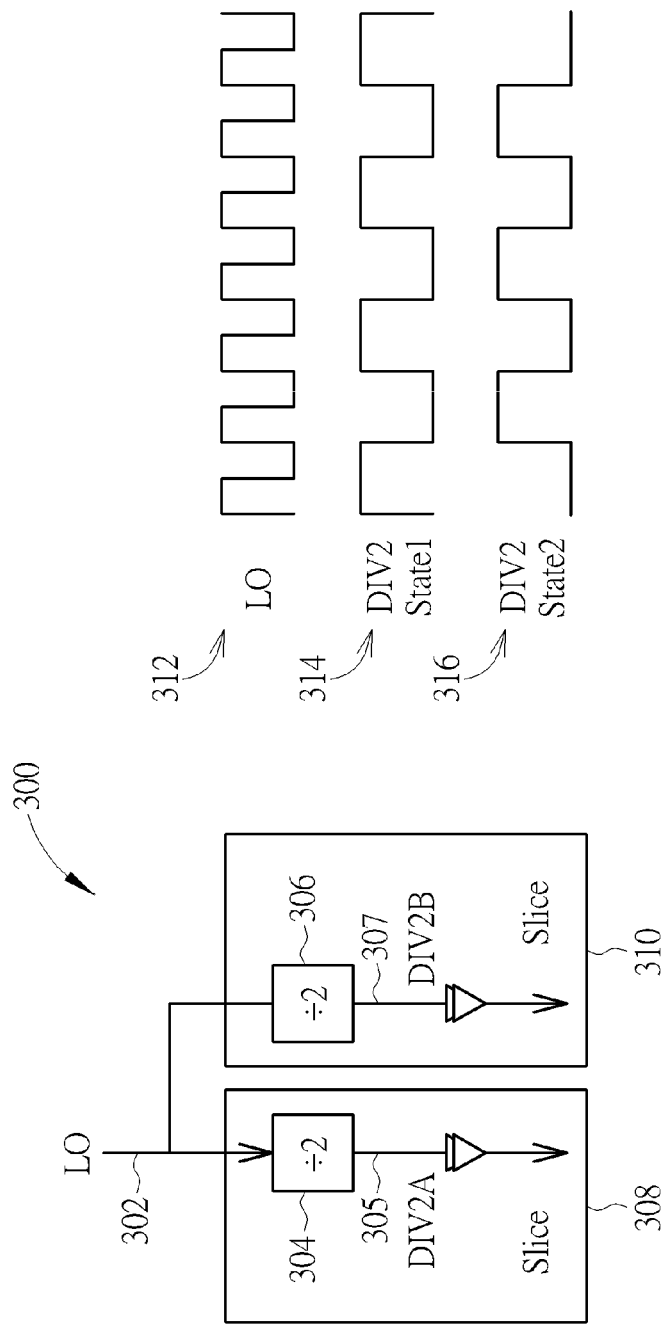
FIG. 3 illustrates a simplified example of a local oscillator operation and associated timing waveforms according to some aspects of the invention.

Referring to FIG. 3, a simplified example of a local oscillator (LO) operation 300 is illustrated according to examples of the invention. The simplified example of a LO operation 300 comprises an LO input 302, a first IC slice 308 that may comprise a number of components (not shown), a divide-by-2 module 304 and a DIV2A output signal 305 operably coupled to at least one logic module (not shown). A second integrated circuit (IC) slice 310 may comprise a number of components (not shown), a further divide-by-2 module 306 and a DIV2B output signal 307 operably coupled to at least one further logic module (not shown). In this example, two slices 308, 310 have been illustrated for clarity purposes only. However, it is envisaged that further slices may be utilised depending on the application and/or implementation considerations.

In this example, slices 308, 310 each comprise an individual divide-by-2 module 304, 306. Therefore, in this example, divide-by-2 modules 304, 306 may be selectively enabled or disabled when the corresponding slice 308, 310 is selectively enabled or disabled. Therefore, compared to the arrangement of FIG. 1, current consumption in FIG. 3 may be further reduced in some implementations as only selectively enabled slices 308, 310 will draw current, since CMOS logic does not draw current when in a static mode.

Thus, in some examples, RF slices may be independently and selectively enabled or disabled slices, for example using one or more switch(es) (not shown) and triggered by a controller or processor, such as controller 214 or processor 208 from FIG. 2.

In some examples, slices 308, 310 may be selectively enabled utilising a supply voltage to the local oscillator 300. In some other examples, slices 308, 310 may be selectively enabled via a multiplexer, in order to prevent slices 308, 310 toggling between states. Therefore, in some examples, selectively enabling slices may allow devices to save power when compared to similar known devices.

A challenge with selectively enabling slices 308, 310 is that there are two possible states 314, 316 for each divide-by-2 module 304, 306 for a given input, wherein only one of the possible states 314, 316 will be correct. Therefore, in one example, divide-by-2 modules 304, 306 are synchronised relative to each other in order to provide a synchronised initial state. However, this may affect robustness and power consumption of the LO 300, potentially increasing complexity and compromising an overall system utilising LO 300.

Figure 7:
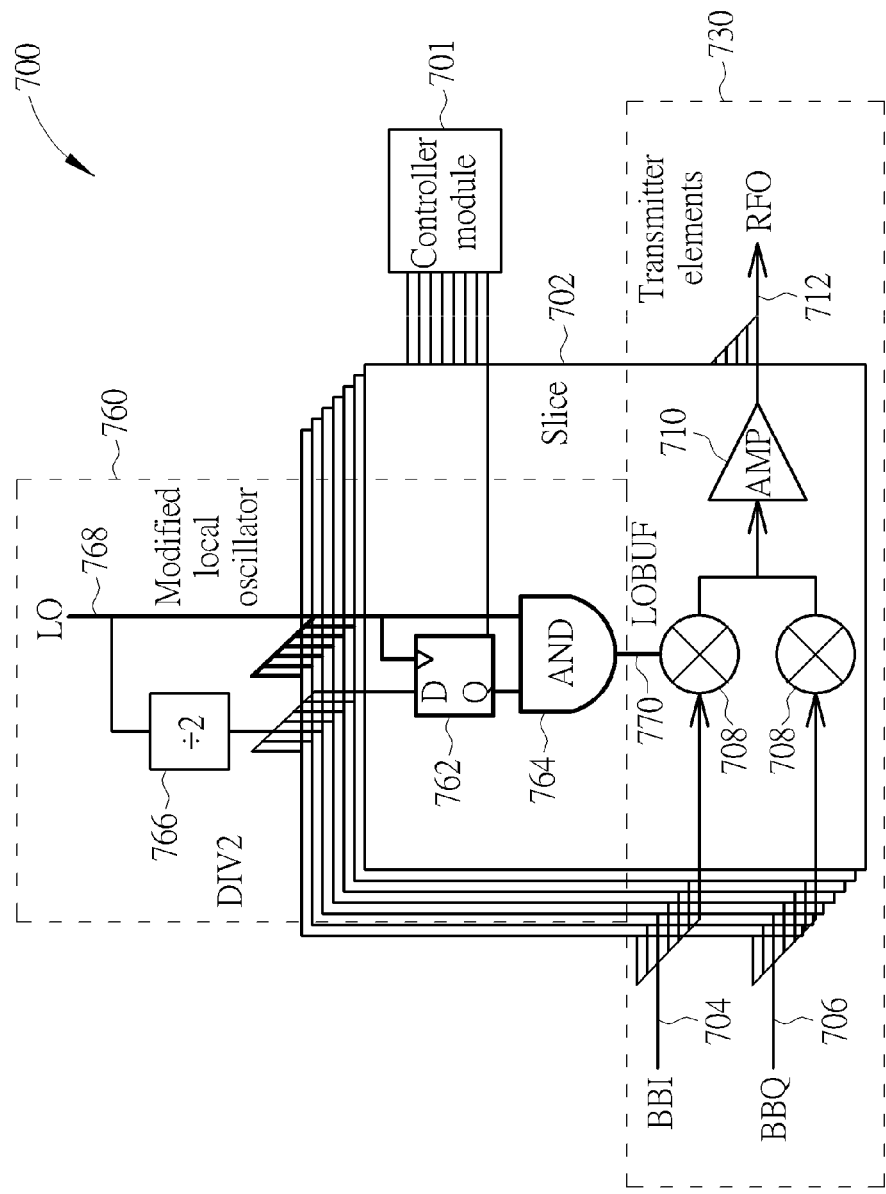
FIG. 7 illustrates a further simplified example of a modified communications unit according to some aspects of the invention.

Hence, in some examples, as output power may be proportional to the number of slices enabled, a plurality of slices may be utilised to generate a higher output power when implemented with a transmitter circuit, for example the transmitter circuit illustrated in FIG. 7. However, as the timing of signals applied to divide-by-2 modules 304, 306 will generally have a random initial condition, the output power of known circuits/arrangements may not be directly proportional to the number of slices enabled. For example, a first enabled portion of the plurality of slices, which may relate to slice 308 for example, may receive the DIV2A 305 output signal that is in a first DIV2 state 314 as illustrated. A second enabled portion of the plurality of slices, which may relate to slice 310 for example, may receive the DIV2B 307 output signal that may be in a second DIV2 state 316. Therefore, as the first DIV2 state 314 may be out of synchronisation with the second DIV2 state 316, some of the enabled slices may cause a varying duty cycle at an output of one or more logic modules (not shown), which may adversely lead to a varying and unpredictable output power. Therefore, in some further enhanced examples, respective slices may be synchronised with respect to the LO waveform, as described below.

Accordingly, there is provided a communication unit that comprises at least one divider module arranged to receive a radio frequency (RF) signal and output a divided representation of the RF signal, and a plurality of sliced RF modules. Each of the plurality of sliced RF modules comprises: an input for receiving a clock signal; a timing synchronisation module arranged to receive the divided representation of the RF signal and synchronise the divided representation of the RF signal to the clock signal, across the plurality of sliced RF modules; and at least one logic module operably coupled to the timing synchronisation module and arranged to receive the clock signal and a synchronised output from the timing synchronisation module. A combiner port is arranged to couple a number of synchronised outputs from the plurality of sliced RF modules. In this manner, a mechanism for current saving and increasing available output power is described.

Figure 4:
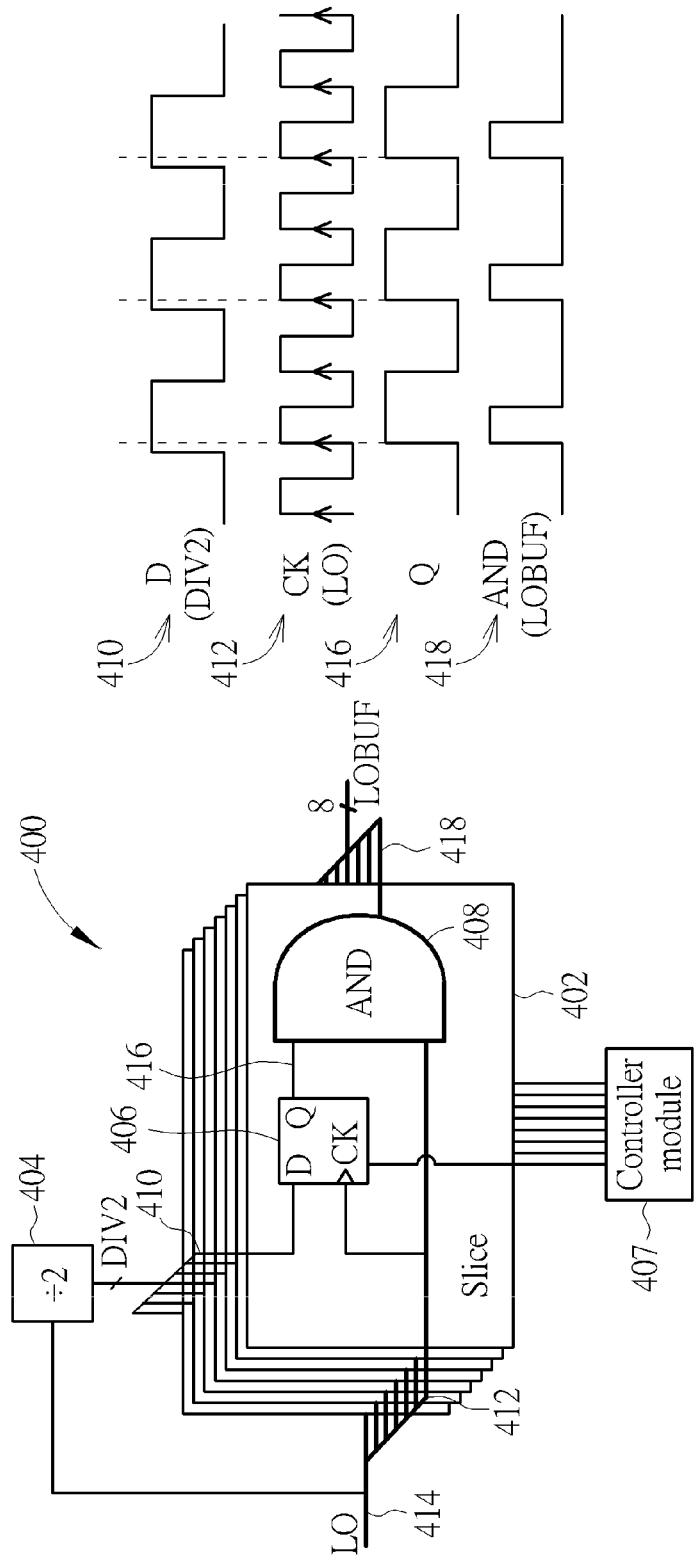
FIG. 4 illustrates a simplified example of a modified local oscillator operation according to some aspects of the invention.

Referring to FIG. 4, a modified local oscillator operation 400 is illustrated according to some aspects of the invention. In this example, the modified local oscillator operation 400 comprises eight slices, with only one slice 402 shown in detail for clarity purposes. Further, in this example, the eight slices may be selectively enabled by a controller module 407. Notably, only one divide-by-2 module 404 is used, which is located external to the eight slices and arranged to provide the same timer synchronised LO signal to each slice.

In this example, slice 402 comprises a D-type flip-flop 406 and at least one logic AND module 408. The D-type flip-flop 406 receives a DIV2 signal 410 from the divide-by-2 module 404 and a clock signal 412 from LO input 414. As the D-type flip-flop 406 may be synchronised to other D-type flip flops on other slices via the clock signal 412, output signal 416 from the D-type flip-flop will also be synchronised with respect to the clock signal 412. Therefore, the logic AND module 408 may receive the synchronised output signal 416 from the D-type flip-flop 406 along with the clock signal 412, which may provide a master/slave configuration. Therefore, in this example, LO buffer (LOBUF) output signals 418 may correspond to a 25% duty cycle based on the clock signal 412 and the synchronised D-type flip-flop output signal 416. The LOBUF output signals 418 may be utilised by one or more mixers (not shown) to provide an output RF signal.

Although examples of the invention are illustrated as utilizing an AND logic gate, it is envisaged that in other examples alternative logic gates/modules may be used, and in some instances generic logic gates/modules, for example to generate arbitrary waveforms with the synchronizer module.

Although some examples of the invention are illustrated with respect to employing a 25% duty cycle, it is envisaged that in other examples other duty cycles may be employed, e.g. 50%, 33%, or waveforms, e.g. a saw-tooth waveform, may be used, for example where the duty cycle and waveform type may be based on the logic and synchronization module used.

For clarity purposes, the structure and operation of only one slice 402 has been illustrated in this example. It should be noted that in this example, the remaining seven slices may have substantially the same structure and operation as slice 402. Therefore, each of the remaining slices may also comprise a D-type flip-flop 406 that may be synchronised with the same clock signal 412. Therefore, as each of the output signals 416 from the D-type flip-flops 406 in the remaining seven slices may have been synchronised based on the clock signal 412, the LOBUF output signals 418 from the logic AND modules 408 may also be synchronised. Therefore, each of the LOBUF output signals 418 from the eight slices may be 'in phase' and synchronised with respect to each other via the clock signal 412 In this example, the output power of an RF signal (not shown) may be proportional to the number of slices that are enabled.

In this manner, the D-type flip-flop 406 functions as a timing synchronisation module and is arranged to output a time-adjusted divided representation of the radio frequency signal. When coupled with the logic AND gate, and output of each of the logic AND gates from each of the enabled RF slices provides a desired RF output signal using a reduced/minimum of drawn current.

An advantage of the modified local oscillator operation 400 may be that the potential random initial condition of the eight divide-by-2 modules of prior art arrangements driving the eight slices, may not influence the potential RF output power available. This may be because the DIV2 signal 410 input to each D-type flip-flop 406 may be synchronised by the clock signal 412, and thus, a synchronised D-type flip-flop 406 output signal 416 may be provided to the logic AND modules 408.

Figure 1:
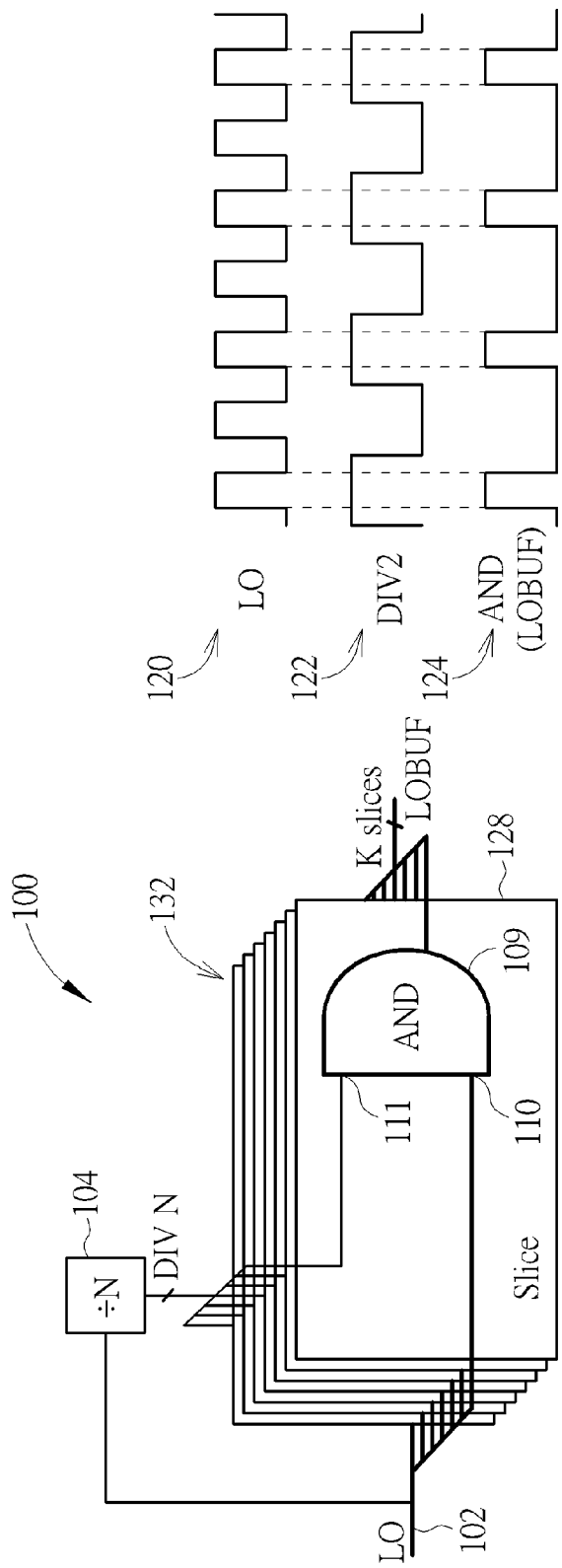
FIG. 1 illustrates a known slicing circuit.

A further advantage of the modified local oscillator operation 400 may be that current saving in excess of that provided in the prior art, for example by FIG. 1, may be achieved. In this example, as the divide-by-2 modules, for example divide-by-2 module 404, may not be directly driving the logic AND modules, for example logic AND module 408, there may be no need for the divide-by-2 module 404 to draw a large current.

In this example, the divide-by-2 module 404 may only be required to supply enough current to drive the D-type flip-flop 406, which may be lower than that required to drive the logic AND module 408. Therefore, as the combined current overhead for each of the eight divide-by-2 modules may be lower, the overall current consumed may also be reduced.

In some examples, the divide-by-2 module 404 may only be required to drive a noise-insensitive node of the D-type flip-flop 406, which is usually high impedance and, therefore, may only require a low drive current.

Further, in this example, the D-type flip-flop 406 may be responsible for driving the logic AND module 408. Therefore, in this example, the D-type flip-flops 406 may require a high current to drive the logic AND modules 408 in each slice. However, in this example, the D-type flip-flops 406 may be sliceable and, therefore, current consumption may be further reduced compared to the device of FIG. 1. This may be because only 'enabled' slices would draw a high current to drive the logic AND modules 408.

In some alternative examples, each of the eight slices may comprise an individual divide-by-2 module 404, which may be operable to provide the DIV2 output signal 410 to its corresponding slice, for example slice 404. In other examples, an individual divide-by-2 module 404 may provide the DIV2 output signal 410 to more than one slice 404. Therefore, in this example, the number of divide-by-2 modules 404 may be less than the number of slices 402. In yet further examples, there may be a single divide-by-2 module 404 that may be operable to provide the DIV2 output signal 410 to all slices.

Figure 5:
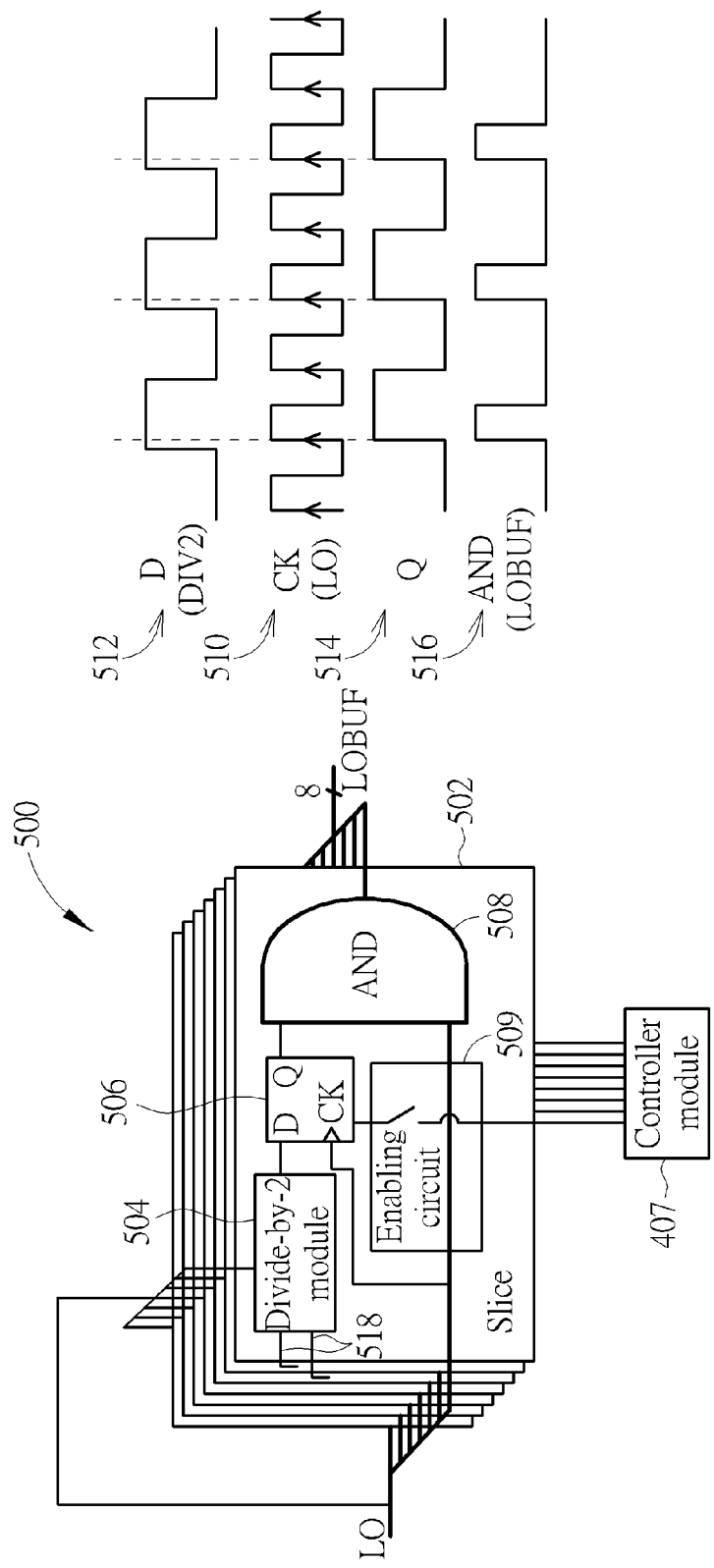
FIG. 5 illustrates a further simplified example of a modified local oscillator operation according to some aspects of the invention.

Referring to FIG. 5, a further modified local oscillator operation 500 is illustrated, in accordance with some aspects of the invention. The layout and operation of the further modified local oscillator operation 500 is similar to that for the modified local oscillator apparatus 400 of FIG. 4. Therefore, for clarity purposes, only new features may be described below in detail.

In this example, each slice 502, with one slice shown in detail for clarity purposes, may be selectively enabled by an enabling circuit 509, which may comprise, for example, a switching module. The enabling circuit 509 may be operably coupled to each slice and arranged to enable one or more selected slices determined by, for example, controller 407.

Further, in this example, each slice 502 comprises a divide-by-2 module 504, a D-type flip-flop 506 and at least one logic AND module 508. In this example, the divide-by-2 module 504 is situated within each slice 502. In this example, the modified local oscillator apparatus 500 comprises eight slices, wherein each slice may comprise similar components to slice 502.

In this example divide-by-2 module 504 may receive a clock signal 510 and output a DIV2 signal 512 to the D-type flip-flop 506. The D-type flip-flop 506 may receive the DIV2 signal from the divide-by-2 module 504, situated on first slice 502, along with the clock signal 510. As the D-type flip-flop 506 may be synchronised by the clock signal 510, the output signal 514 from the D-type flip-flop 506 may be synchronised and in phase with other D-type flip-flop output signals from other slices within the local oscillator operation 500. Therefore, LOBUF output signal 516 from the logic AND module 508 may be synchronised and in phase with other LOBUF output signals from other slices within the local oscillator operation 500.

In some examples, divide-by-2 module 504 may be synchronised 518 with other divide-by-2 modules on other slices. This may allow for a similar signal to be utilised by all relevant slices, thereby allowing for similar LOBUF output signal(s) 516 on relevant slices.

Thus, the timing synchronisation module may comprise a plurality of timing synchronisation modules, with a timing synchronisation module located on each of the plurality of sliced radio frequency modules, where the plurality of timing synchronisation modules is arranged to synchronise a random initial condition of at least one divider module across the plurality of sliced radio frequency modules.

An advantage of the further modified local oscillator apparatus 500 may be that current saving in excess of that provided by FIG. 1 may be achieved. In this example, as the divide-by-2 module 504 may be situated on the slice 502, there may be no current overhead. In some examples, this may be because only divide-by-2 modules 504 situated on enabled slices may draw current.

In the examples of FIG. 4 and FIG. 5, the divide-by-2 modules, for example divide-by-2 modules 404 and 504, may be required to provide a DIV2 output signal, for example DIV2 output signal 410 and 512, which may have a lower frequency compared to clock signal 412, 510. This may be because, in some examples, flip-flops cannot operate correctly if the clock signal 412, 510 has a frequency that is lower or the same as the DIV2 410, 512 output signals.

Figure 6:
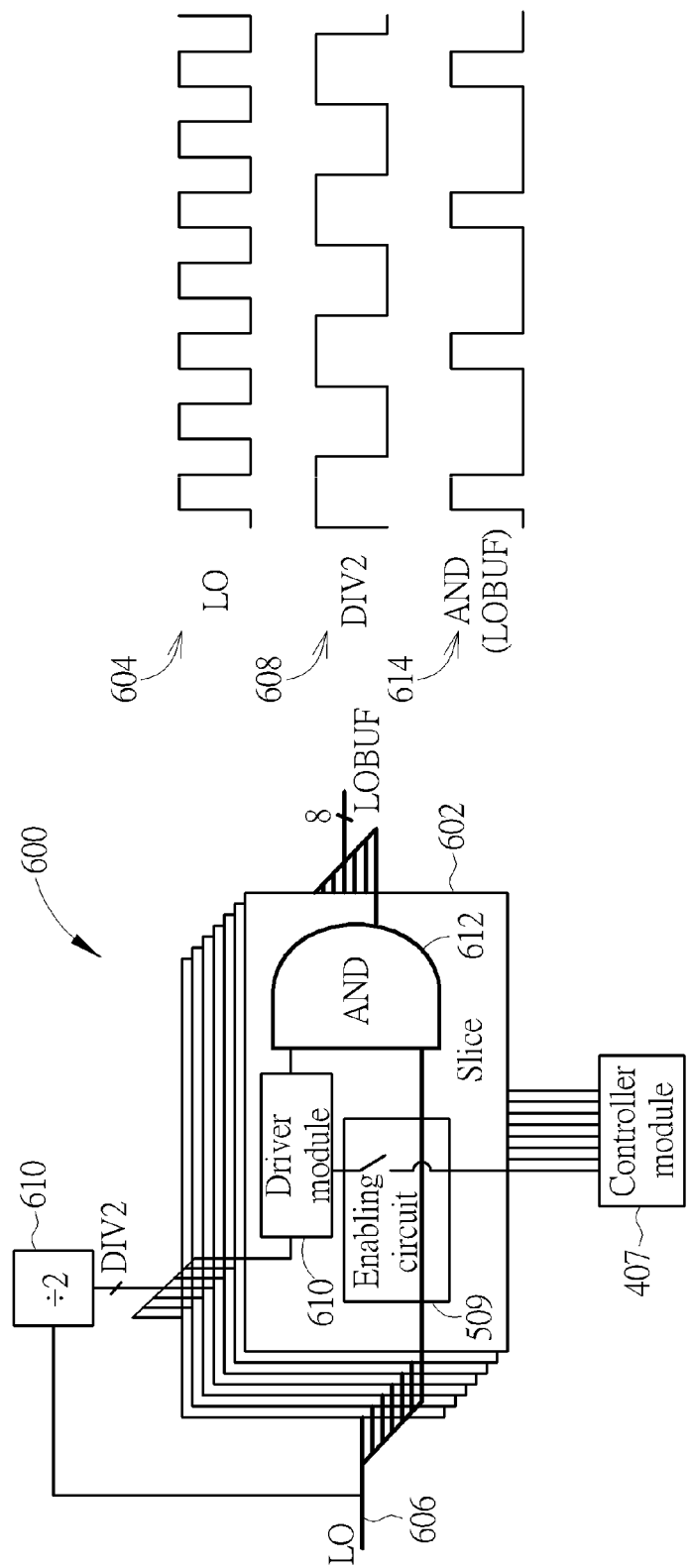
FIG. 6 illustrates a yet further simplified example of a modified local oscillator operation according to some aspects of the invention.

Referring now to FIG. 6, a yet further modified local oscillator apparatus 600 is illustrated according to some aspects of the invention. In this example, the modified local oscillator apparatus 600 comprises eight slices, with one slice 602 shown in detail.

In this example, each slice 602 may be selectively enabled by a controller module, for example controller module 407. In some examples, which may not necessarily be limited to FIG. 6, an enabling circuit similar to enabling circuit 509 of FIG. 5 may be utilised in conjunction with controller module 407.

Each slice receives a clock signal 604 from LO input 606 and a DIV2 output signal 608 provided by a divide-by-2 module 610. In this example, the DIV2 output signal 608 may be received by a driver module 610, for example a low noise amplifier, which may be operable to drive a current sensitive logic AND module 612. In this example, as there may only be one divide-by-2 module 610, there may be no synchronisation issues between slices. Therefore, all LOBUF output signals 614 from logic AND modules 612 should be synchronised across all slices.

Thus, the timing synchronisation module may comprise a plurality of timing synchronisation modules, with a timing synchronisation module located on each of the plurality of sliced radio frequency modules, where the plurality of timing synchronisation modules is arranged to synchronise a random initial condition of at least one divider module across the plurality of sliced radio frequency modules.

An advantage of the modified local oscillator operation 600 may be that current saving in excess of that provided by FIG. 1 may be achieved. In this example, as the divide-by-2 module 610 may not be directly driving the noise sensitive logic AND module 612, a smaller current may be utilised that is sufficient to drive the driver module 610. The driver module 610 may be sliceable and, therefore, a high value of current may only be required to supply the noise sensitive logic AND module 610 if respective slices are enabled.

In some examples referred to above, utilising a number of available slices, with aspects of the invention, may reduce current consumption when compared to a prior art device utilising the same number of slices, for example the prior art device illustrated in FIG. 1.

Referring to FIG. 7, a simplified example of a communications unit 700 is illustrated, comprising transmitter elements 730 and a modified local oscillator 760. In this example, the communications unit 700 has been illustrated with 8 slices, with only one slice 702 shown in detail for clarity purposes. In some examples, the eight slices may be selectively enabled by a controller module 701. In some other examples, any number of slice(s) may be utilised, which may be dependent on user requirements.

In this example, the modified local oscillator operation of FIG. 4 has been utilised. However, any modified local oscillator illustrated above may be utilised in place of modified local oscillator 760.

The transmitter elements 730 may comprise, for each slice 702, baseband quadrature inputs BBI 704, BBQ 706 operably coupled to a number of slices 702 via quadrature mixers 708. An amplifier 710 receives output signals from the quadrature mixers 708, and subsequently modifies the output signals before outputting a modified signal to a radio frequency output (RFO) 712, which may be a combiner port. In this example, each slice 702 may comprise the same functionality The modified local oscillator 760 may comprise, for each slice, a D-type flip-flop 762 and at least one logic AND module 764. The D-type flip-flop 762 may receive a signal, for example a DIV2 signal, from a divide-by-2 module 766. However, any divide-by-N module is envisaged. Notably, in this example, only one divide-by-2 module 766 has been utilised, which may be located external to the slice (s) 702 of the communications unit 700, and arranged to provide a substantially similar timer synchronised LO signal 768 to each slice, for example slice 702.

The D-type flip-flop 762 may receive the DIV2 signal from the divide-by-2 module 766 and a clock signal from LO input 768. In this example, the D-type flip-flop 762 may be synchronised to other devices on other slices, due to receiving the clock signal 768. Therefore, an output signal from the D-type flip-flop 762 may also be synchronised with respect to the clock signal 768. Therefore, the logic AND module 764 may receive the synchronised output from the D-type flip-flop 762 along with the clock signal 768, which may provide a master/slave configuration. Therefore, in this example, LOBUF output signal 770 from the logic AND module 764 may correspond to a 25% duty cycle based on the clock signal 768 and the synchronised D-type flip-flop output signal. The LOBUF output signal 770 may be utilised by quadrature mixers during operation of the communications unit 700.

In this example, the communications unit 700 comprises a number of parallel slices 702 that can be selectively enabled or disabled. Therefore, the total output 712 may be proportional to the number of parallel slices that are enabled. Therefore, current saving may be achieved by enabling a subset of the available number of parallel slices 702.

In some examples, the local oscillator apparatus illustrated in the above mentioned FIGs have been shown with eight slices. It should be noted that this is merely for illustrative purposes, and any number of slices may be utilised, which may be dependent on user requirements or device constraints, etc.

Further, in some examples, the local oscillator operation illustrated in the above mentioned FIGs has been shown as a separate module. It should be noted that this is merely for explanatory purposes, and aspects of the invention may be incorporated into any suitable device, for example a transmitter type device, receiver type device or a transceiver type device as well as in a separate local oscillator circuits.

Although aspects of the invention may have been illustrated with at least one logic AND module, this is merely for explanatory purposes and any logic module or number of logic modules that has the same, or similar, functionality to a logic AND module may be utilised. Furthermore, in some examples, it may be envisaged that aspects of the invention may utilise other modules or circuits than one logic module per slice.

Further, aspects of the invention may have been illustrated with a D-type flip-flop. However, it should be noted that the use of a D-type flip-flop is not critical, and any flip-flop device suitable for performing the same, or similar, functionality as a D-type flip-flop may be utilised.

For example, a positive edge triggered D flip-flop, a master slave edge triggered D flip-flop, latches or other types of flip-flop may be equally suitable. Further, any logic module equivalent of any above mentioned or equivalent flip-flops or latches may also be utilised. For example, in the case of a D-type flip-flop, the use of a number of NAND gates and NOT gates may be utilised to obtain the functionality of the D-type flip-flop illustrated in the above mentioned examples. In some further examples, it is envisaged that the D-type flip-flop illustrated in some examples of the invention may be replaced by any circuit or device that is operable to synchronise with a clock signal, for example clock signal 412, 510.

Furthermore, although some aspects of the invention may have been illustrated with a 25% duty cycle, it should be noted that this is merely for explanatory purposes and any duty cycle is envisaged.

In some examples, the aforementioned slicing concepts may be applied to any low noise slicing design, for example where a low noise synchronization module takes inputs from (a) one reference low noise driver (e.g. a LO) and (b) multiple references that are noise non-sensitive but cannot be sliced due to their ability to reside in one of multiple states. In some examples, one or more or all the circuits within one or more of the slices are output power and noise scalable to a desired current consumption level. In some examples, the output power and noise may be scalable to a desired current consumption level via software programmability.

Although some aspects of the invention have been described with reference to their applicability to a $3^{rd}$ generation partnership project (3GPP™) system, it will be appreciated that the invention is not limited to this particular cellular communication system. It is envisaged that the concept described above may be applied to any radio frequency communication system, for example the long term evolution (LTE) cellular communication standard, sometimes referred to as $4^{th}$ generation (4G) systems.

In particular, it is envisaged that the aforementioned inventive concept can be applied by a semiconductor manufacturer to any integrated circuit comprising a radio frequency and/or synchronous clock application. It is further envisaged that, for example, a semiconductor manufacturer may employ the inventive concept in a design of a stand-alone device, or application-specific integrated circuit (ASIC) and/or any other sub-system element.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved communication unit and sliced radio frequency module have been described, wherein the aforementioned disadvantages with prior art arrangements have been substantially alleviated.

What is claimed is:

1. A communication unit comprising:
    at least one divider circuit arranged to receive a radio frequency (RF) signal and output a divided representation of the RF signal; and
    a plurality of sliced RF modules, with each of the plurality of sliced RF modules comprising:
        an input for receiving a clock signal;
        a timing synchronisation circuit arranged to receive the divided representation of the RF signal and synchronise the divided representation of the RF signal to the clock signal, across the plurality of sliced RF modules; and
        at least one logic circuit operably coupled to the timing synchronisation circuit and arranged to receive the clock signal and a synchronised output from the timing synchronisation circuit; wherein,
        the synchronised output is operably coupled to a combiner port arranged to couple a number of synchronised outputs from the plurality of sliced RF modules;
        wherein the at least one logic circuit is operably coupled to the timing synchronisation circuit, rather than being directly connected to the at least one divider circuit, for reducing current usage in RF communications.

2. The communication unit of claim 1 wherein the timing synchronisation circuit is arranged to output a time-adjusted divided representation of the RF signal.

3. The communication unit of claim 1 wherein the timing synchronisation circuit is at least one flip-flop circuit.

4. The communication unit of claim 3 wherein the at least one flip-flop circuit is a D-type flip flop.

5. The communication unit of claim 1 wherein the timing synchronisation circuit is a driver circuit.

6. The communication unit of claim 1 wherein each sliced RF module comprises the at least one divider circuit.

7. The communication unit of claim 1 wherein the at least one logic circuit comprises a logic AND circuit.

8. The communication unit of claim 1 wherein the RF signal is a local oscillator signal and the at least one divider circuit comprises a divide-by-two circuit.

9. The communication unit of claim 1 wherein the communication unit further comprises a controller arranged to selectively enable one or more of the plurality of sliced RF modules.

10. A sliced radio frequency (RF) module comprising:
    an input for receiving from at least one divider circuit a divided representation of a RF signal;
    an input for receiving a clock signal;
    a timing synchronisation circuit arranged to receive the divided representation of the RF signal and synchronise the divided representation of the RF signal to the clock signal, across the plurality of sliced RF modules; and
    at least one logic circuit operably coupled to the timing synchronisation circuit and arranged to receive the clock signal and a synchronised output from the timing synchronisation circuit; and
    an output port for outputting a synchronised output to a combiner operably coupleable to at least one further sliced RF module;
    wherein the at least one logic circuit is operably coupled to the timing synchronisation circuit, rather than being directly connected to the at least one divider circuit, for reducing current usage in RF communications.

11. The sliced RF module of claim 10 wherein the timing synchronisation circuit is arranged to output a time-adjusted divided representation of the RF signal.

12. The sliced RF module of claim 10 wherein the timing synchronisation circuit is at least one flip-flop circuit.

13. The sliced RF module of claim 12 wherein the at least one flip-flop circuit is a D-type flip flop.

14. The sliced RF module of claim 10 wherein the timing synchronisation circuit is a driver circuit.

15. The sliced RF module of claim 10 wherein the sliced radio frequency module comprises the at least one divider circuit.

16. The sliced RF module of claim 10 wherein the at least one logic circuit comprises a logic AND circuit.

17. The sliced RF module of claim 10 wherein the RF signal is a local oscillator signal and the at least one divider circuit comprises a divide-by-two circuit.

18. The sliced RF module of claim 10 wherein the sliced RF module further comprises a selectable enabling circuit arranged to selectively enable the sliced RF module.

* * * * *